United States Patent [19]
Hobbs et al.

[11] Patent Number: 5,761,303
[45] Date of Patent: Jun. 2, 1998

[54] INCLUSION OF AUDIO SIGNAL WITHIN VIDEO SIGNAL, AT BAND EDGES

[75] Inventors: Gary Lamont Hobbs; Byron Lynn Johnson, both of Indianapolis, Ind.

[73] Assignee: AT&T Corp, Middletown, N.J.

[21] Appl. No.: 581,643

[22] Filed: Dec. 28, 1995

[51] Int. Cl.[6] .................. H04N 7/167; H04L 9/00
[52] U.S. Cl. ........................ 380/19; 380/6; 380/7; 380/9; 380/10
[58] Field of Search .................. 380/6, 7, 9, 10, 380/19, 49

[56] References Cited

U.S. PATENT DOCUMENTS 4,318,125 3/1982 Shutterly .................. 380/19 X

Primary Examiner—Bernarr E. Gregory
Attorney, Agent, or Firm—Alfred G. Steinmetz

[57] ABSTRACT

A system wherein audio samples are added to a video signal, but within the time-frame allocated to video information, thereby displacing video data. Two audio samples are preferably placed in each video line: at the beginning, and at the end. When the video lines are "stacked" to form a video image, the audio forms noisy vertical stripes at the sides of the image, each of which is about 6 percent of the width of the image. The invention stretches the video image, to cover the stripes.

5 Claims, 7 Drawing Sheets

INCLUSION OF AUDIO SIGNAL WITHIN VIDEO SIGNAL, AT BAND EDGES

The invention concerns the inclusion of a digitized audio signal within a video signal, as opposed to transmitting the audio signal on a separate carrier.

BACKGROUND OF THE INVENTION

Video signals commonly use two carriers: one for the video signal, and one for the audio signal. Overall complexity can perhaps be reduced by including the audio signal within the video signal.

Such inclusion requires that the amount of information carried by the video signal does not fully occupy the bandwidth allocated. A typical allocated bandwidth is 6 MegaHertz. Under one common video standard, 30 frames of video information are transmitted per second. Each frame contains 525 lines of information. Ordinarily, under this standard, no space is available in the bandwidth for insertion of additional information.

SUMMARY OF THE INVENTION

In one form of the invention, an audio signal is sampled. Two samples are inserted into each line of the associated video signal: one is positioned at the beginning of the line, and the other at the end. Each sample displaces about 6 percent of the video information contained within the line.

The cumulative effect of the six percent displacements in all lines is to produce two narrow vertical bands of noise-like imagery, on both the left and right sides of the video image. The invention removes these bands.

DETAILED DESCRIPTION OF THE INVENTION

AFD Compression

Figure 1:
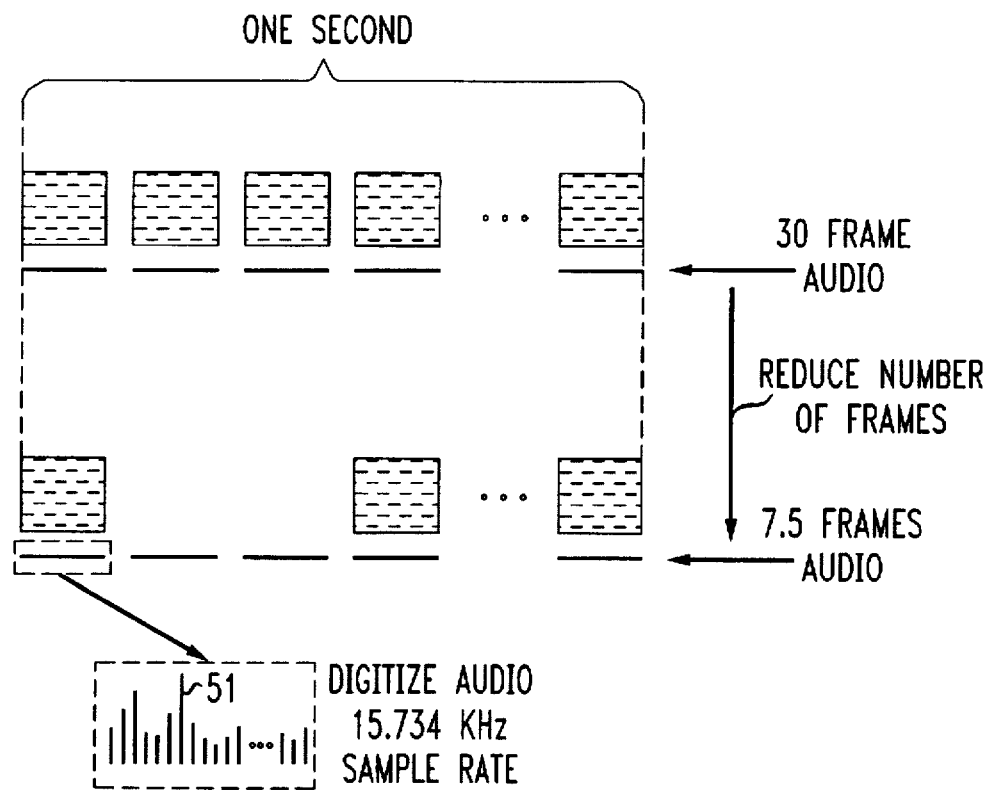
FIG. 1 illustrates reduction of the number of frames in an video signal, and digitizing the audio signal.

FIG. 1, top, illustrates a video signal running at 30 frames per second, plus the accompanying audio tracks. The invention reduces the number of frames, as indicated.

One approach to this reduction is called the Alternate Field Drop (AFD) method, wherein three of every four frames are eliminated, or "dropped," and the single remaining frame, of each set of four, is transmitted. This approach reduces the number of frames from 30 to 7.5, per second. Audio signals corresponding to the dropped frames are not themselves dropped, as indicated by the presence of the audio tracks which correspond to the dropped frames.

This reduction in frame rate reduces the bandwidth required by the video signal.

Sampled Audio

The audio is sampled, as indicated, at a sampling rate of 15.734 KHz. This sampling rate is identical to the frequency of the horizontal synch pulses, which are indicated in other Figures. Since each horizontal synch pulse is associated with one line of video, sampling the video at the horizontal synch pulse frequency allows integral multiples of audio samples to be inserted into each video line, as will be explained more fully later.

Figure 2:
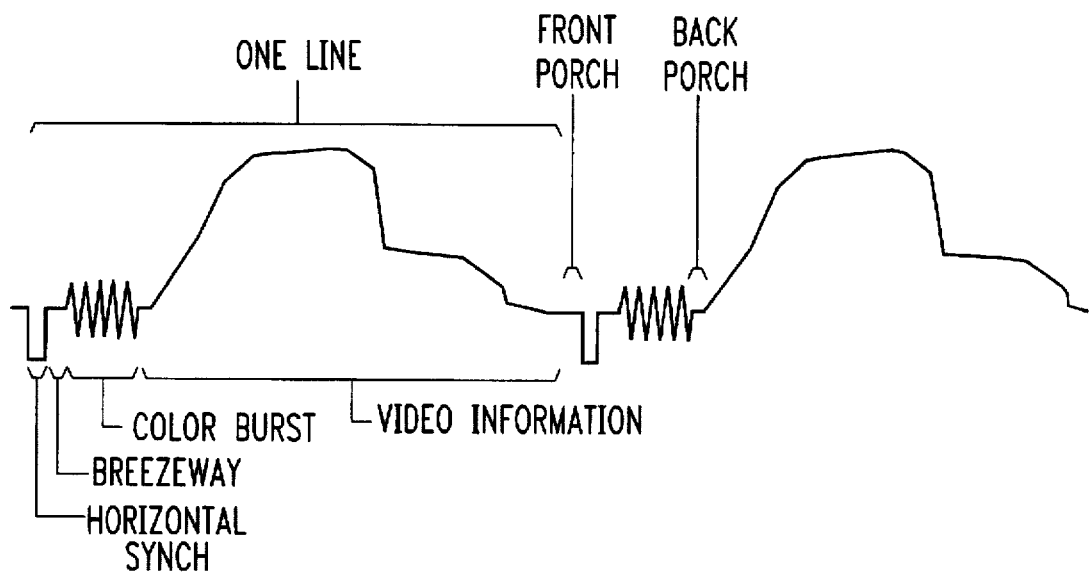
FIG. 2 represents a prior-art video signal.
Figure 3:
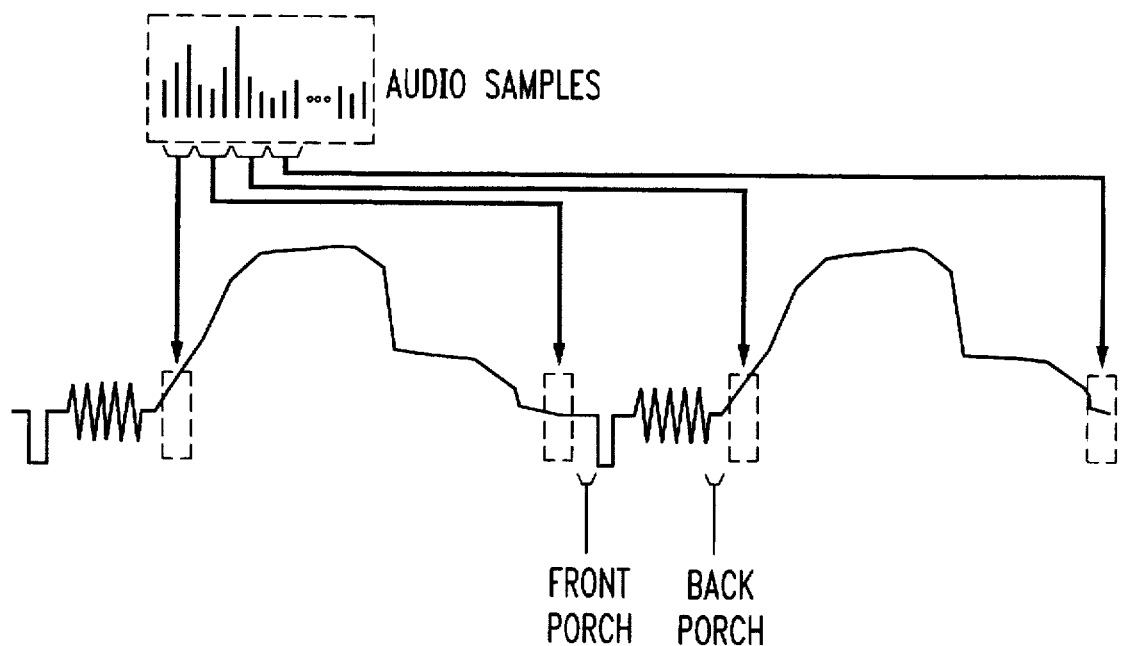
FIG. 3 illustrates insertion of audio samples into the video signal.

The sampled audio is inserted into the video signal, as indicated in FIG. 3, which is explained by first referring to FIG. 2. FIG. 2 illustrates a common, prior art video signal. Two relevant parts of the signal are the FRONT PORCH and the BACK PORCH. The invention places some of the audio samples prior to each FRONT PORCH, and places other samples just subsequent to each BACK PORCH, as shown in FIG. 3.

The audio samples displace, or overwrite, part of the video signals in each line. That is, when the receiver of the signal "stacks up" all the lines, the left parts, and the right parts, of all the lines collectively generate two narrow, vertical bands of noise-like imagery. The imagery is noise-like because it results from generating video pixels from audio information.

As will be explained later, the invention solves this problem by "stretching" the remaining part of the image to cover these two vertical bands.

The AUDIO SAMPLES in FIGS. 1 and 3 take the form of binary numbers. These binary numbers are inserted into the video signal by the known technique of M-ASK (M-Amplitude Shift Keying). FIG. 4 will explain M-ASK.

M-ASK

Single-Bit Symbols

Figure 4A:
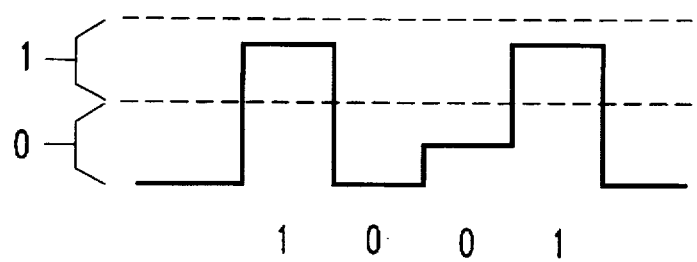
FIGS. 4A, 4B, and 4C illustrate concepts used in M-ASK encoding.

FIG. 4A illustrates M-ASK for a four-symbol number, 1001. Each symbol consists of one bit. Since each bit can take, at most, two possible values, two voltage levels are sufficient to represent each bit. (In practice, voltage ranges, rather than levels, are used.)

Thus, in FIG. 4A, any signal falling into the voltage range labeled "0" is treated as a ZERO, and any signal falling into the range labeled "1" is treated as a ONE.

The waveform indicates the encoding for the number 1001.

Two-Bit Symbols

Figure 4B:
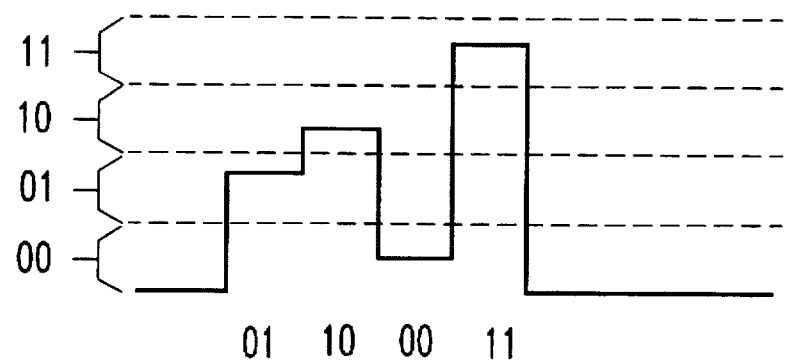

FIG. 4B illustrates M-ASK for another four-symbol number, but in which each symbol consists of two bits. Since a two-bit number can take four possible values, four voltage levels are necessary to represent each symbol. The four voltage levels are indicated in the Figure.

The waveform indicates the encoding for the number 0110 0011, which is divided into four symbols, each represented by two bits.

Three-Bit Symbols

Figure 4C:
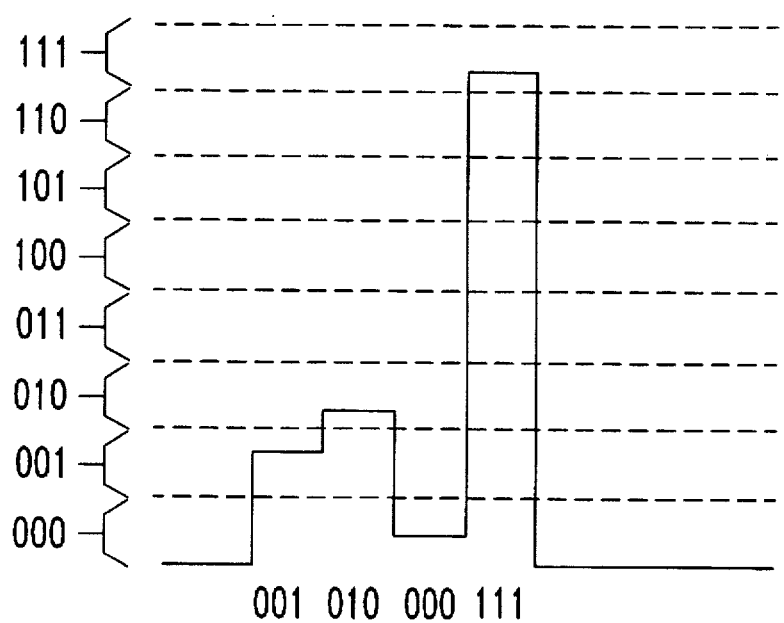

FIG. 4C illustrates M-ASK for another four-symbol number, but in which each symbol consists of three bits.

Since a three-bit number can take eight possible values, eight voltage levels are necessary to represent each symbol. The eight voltage levels are indicated in the Figure.

The waveform indicates the encoding for the number 001 010 000 111, which is divided into four symbols, each represented by three bits.

General Case

In the general case, a symbol containing K bits requires a number of voltage levels equal to 2 raised to the K power. FIGS. 4A, 4B, and 4C are consistent with the general case. In FIG. 4A each symbol contains one bit (K=1). The number of bits assigned to each symbol is 2 ($2^1$=2).

In FIG. 4B, each symbol contains two bits (K=2). The number of bits assigned to each symbol is 4 ($2^2$=4), and so on.

Insertion of Samples

Figure 5:
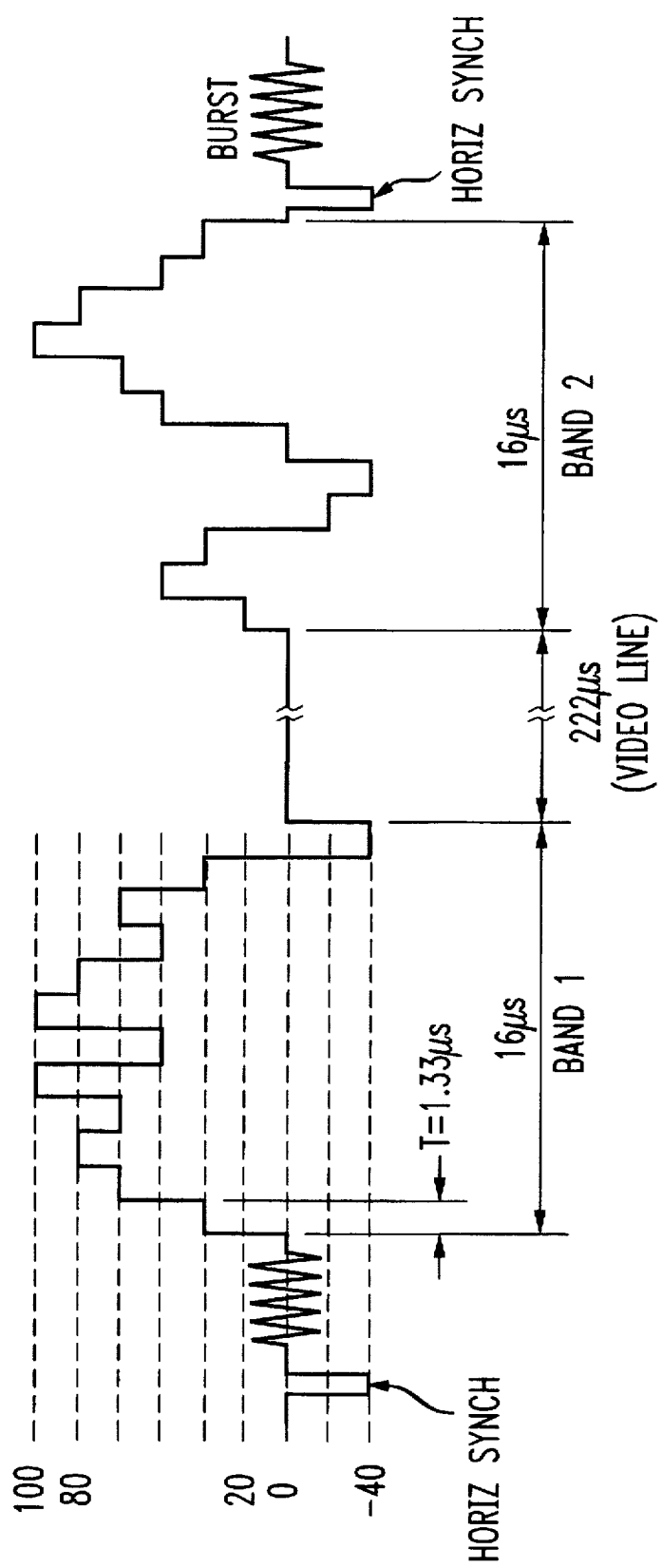
FIG. 5 illustrates, in greater detail, the insertion of audio samples indicated in FIG. 3.

FIG. 3 illustrated the insertion of the audio samples in a very approximate manner. FIG. 5 shows the insertion in greater detail. The audio samples are contained in two BANDs shown in FIG. 5, which are inserted at the beginning, and the end, of the video information. The two BANDs will be described in more quantitative detail.

Quantitative Discussion

Although not discussed above, some overhead bits are added to each audio sample, for purposes such as error correction. The total number of bits (audio information plus overhead) in each sample is 18. These 18-bit groups will be termed "packets."

Four Packets per Line

As stated above, one audio sample is derived for each video line. As discussed above, under AFD compression, every four video frames are reduced to a single frame. However, the amount of audio information is not affected. Thus, four frames' worth of audio samples must be inserted into a single video frame.

Restated in a very general manner: since the audio sampling rate equals the horizontal synch pulse frequency, then the number of audio samples equals the number of lines generated in a single frame (525 in both cases). But since the number of video frames has been reduced by 75 percent (every four have been reduced to one), the audio for four frames must be packed into a single frame. Thus, each line must carry four audio samples, instead of the single sample generated by sampling at the synch frequency.

(It will be seen that this restatement only illustrates general principles, because, for example, some audio information is discarded, and other information is added to the audio signal.)

Four Packets Contain 72 Bits, ASK'ed into 24 Symbols

Four 18-bit packets are associated with each video line, totalling 72 bits of audio per line (4×18=72). Since M-ASK encoding is employed, and eight levels are used (as in FIG. 4C), the symbol length becomes three bits each. 72 bits reduces to 24 symbols (72/3=24).

Thus, the four 18-bit packets are encoded as 24 symbols, of 3 bits each. The 24 symbols are shown in FIG. 5: BAND 1 contains 12 symbols, and BAND 2 contains the other 12.

Timing

In FIG. 5, each BAND contains 12 symbols, and each BAND is 16 microseconds in length. Each sumbol occupies a length T, which is 1.33 micro-seconds, as indicated (16/12=1.33). The two BANDs occupy the left and right 16 microseconds of video information, for a total occupancy of 32 microseconds. The video information occupies the remaining 222 micro-seconds of the line.

Given these time intervals, the two BANDs (ie, the audio information) occupy about 12.6 percent of the total line. (32/(222+32)=0.126). Ordinarily, these BANDS will, collectively, generate two vertical, noise-like stripes in the video image, one one the left side, and the other on the right side. The invention accommodates this by stripping out the noisy stripes (caused by the audio) and stretching the video information by the 12.6 percent stated above.

This stretching involves matrix computation (the video image is a matrix of pixels). Such computation is known in the art.

Training Sequence

FIG. 5 shows reference levels. The units are given in IRE, at the left of the Figure. It is not feasible to set these levels shown in advance. For example, assume that the range defined by levels 0 and 20 IRE were set, in advance, at 0 and 80 millivolts (mV), respectively. If a transmitter attempted to send a signal of 50 mV, in order to fall into this range, the receiver may instead receive a signal of, say, 38 mV, due to various factors. The receiver did not receive the signal intended.

Figure 6:
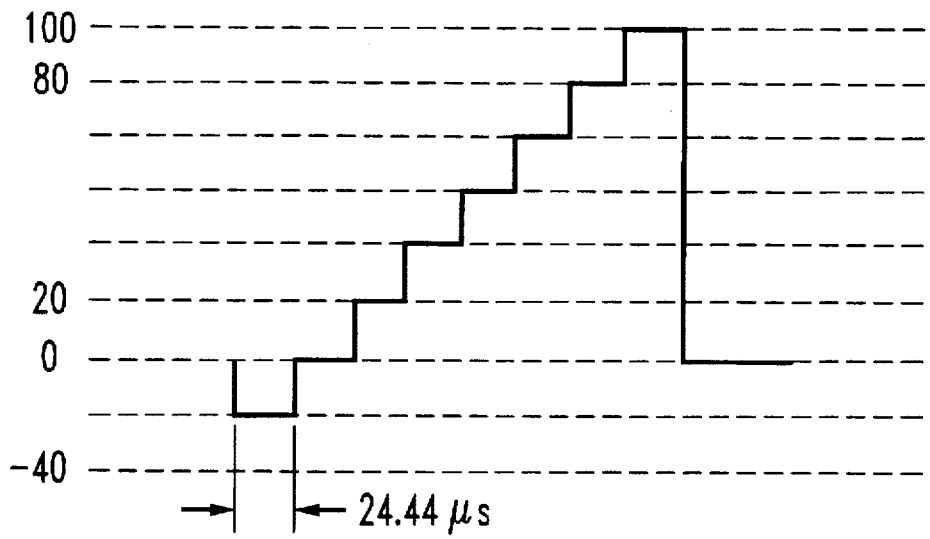
FIG. 6 illustrates a training sequence which is transmitted to define the IRE levels shown at the left of FIG. 5.

To accommodate this problem, the transmitter defines the levels shown in FIG. 5, by periodically transmitting a training sequence. FIG. 6 illustrates one such training sequence.

The training sequence is a sequence of 9 signals, which, together, define the 8 intervals required for three-bit symbols. Each training signal is 24.44 micro-seconds in duration, as indicated.

The training sequence is transmitted during time periods when the transmission channel is otherwise idle, such as during the vertical blanking interval (VBI). During VBI, the electron guns are switched off, so that, even though the training sequence is being transmitted, the training sequence has no effect on the video image.

The training sequence shown in FIG. 6 is a staircase, having steps of identical height. However, in general, identical step heights is not required. That is, it is not necessary that level 80 IRE represent a voltage which is four times 20 IRE.

Figure 7:
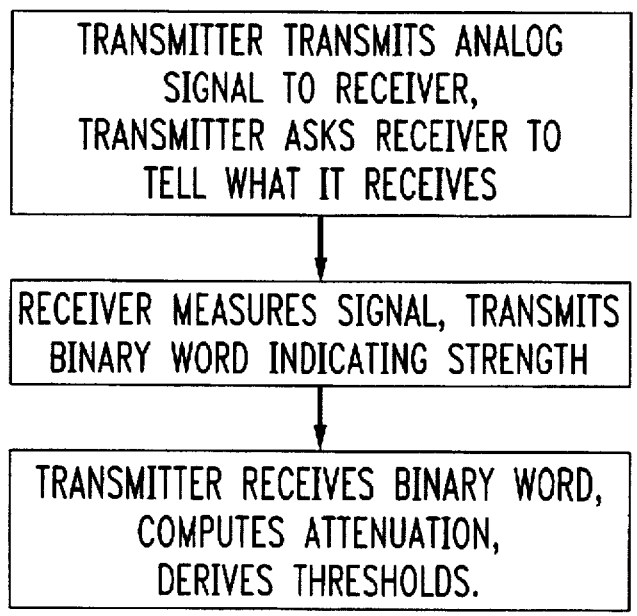
FIG. 7 is a flow chart illustrating logic used by part of the invention.

One approach to setting the levels is given by the flow chart of FIG. 7. The transmitter transmits an analog signal representing a particular level and, in effect, asks the receiver what was received. The receiver measures the signal, and transmits a binary number indicating the signal strength. (In general, the attenuation which affected the analog signal does not affect the binary number.) When the transmitter receives the binary number, the transmitter can determine the attenuation of the signal. This process is repeated for all levels.

Based on the attenuation for each signal, the transmitter sets the levels accordingly. For example, if it is found that the sixth level is hardly attenuated at all, and that the seventh level is attenuated significantly, then, ordinarily, the sixth and seventh levels would lie quite close to each other, which is not desirable. The transmitter would re-define these levels, in order to create a greater separation.

Encoder

Figure 8:
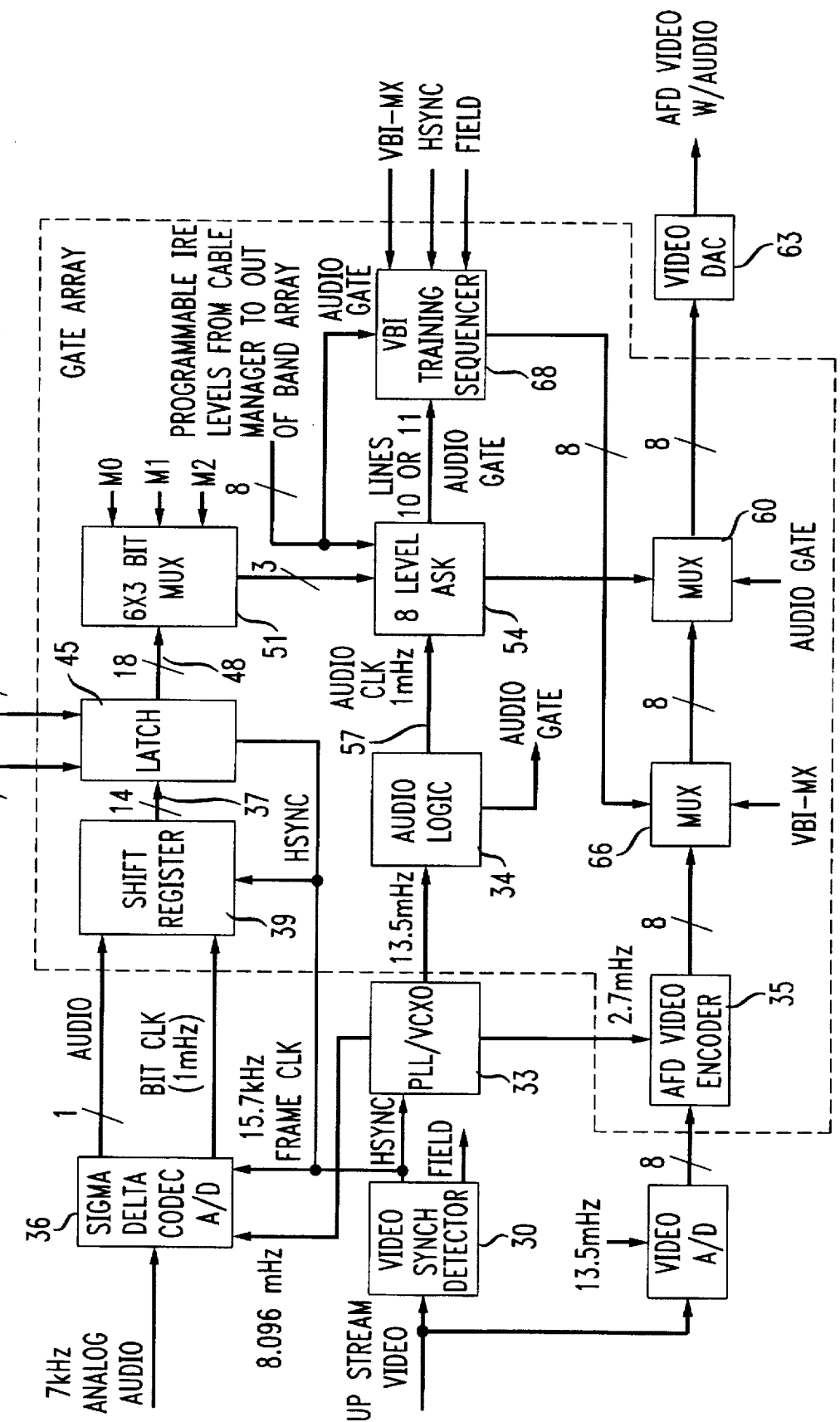
FIG. 8 illustrates a block diagram of an encoder used to insert audio samples into a video signal.

FIG. 8 is a block diagram of an encoder usable for inserting audio samples into a video signal. A VIDEO SYNCH DETECTOR 30 detects horizontal synch pulses. A Phase-Locked Loop (PLL) 33 generates three clock signals, which are in-phase with the synch pulses.

Two of the clock signals run at 13.5 MHz, and 27 MHz, as indicated, and are used to clock processing systems, indicated by AUDIO LOGIC block 34 and AFD VIDEO ENCODER 35. The other clock runs at 15.734 KHz, which is identical to the horizontal synch pulse frequency.

The latter clock is used to trigger a SIGMA-DELTA CODEC 36, which, together with SHIFT REGISTER 39, produces a sequence of 14-bit samples, on bus 37, at the same frequency as the horizontal synch pulses. (16 bits were produced by the sampling, but the two least significant bits in each are dropped.) Each 14-bit word produced on bus 37 corresponds to one of the samples shown in FIG. 1, such as sample S1.

These 14-bit words are held in a LATCH 45 in FIG. 8, wherein additional, overhead, bits can be added, such as error-correcting bits. Adding four overhead bits produces an 18-bit word on bus 48, corresponding to the 18-bit word discussed above, in the section "Quantitative Discussion."

A multiplexer 51 divides each 18-bit word into a sequence of six 3-bit words. Each 3-bit word corresponds to the symbols, discussed above. Each 3-bit word is converted into the proper level level (to conform to the pattern shown in FIG. 4C), by the 8-LEVEL ASK 54.

Based on the clock signal 57 the symbols are grouped into groups of 12 symbols, and are taken from the ASK 54 and multiplexed into the video signal by multiplexer 60, to produce the signal shown (in part) in FIG. 5. This signal is reconverted to a normal analog signal by the VIDEO DAC 63.

VBI TRAINING SEQUENCER generates the training sequence shown in FIG. 6. This training sequence is inserted into the video signal by multiplexers 60 and 66.

Decoder

Figure 9:
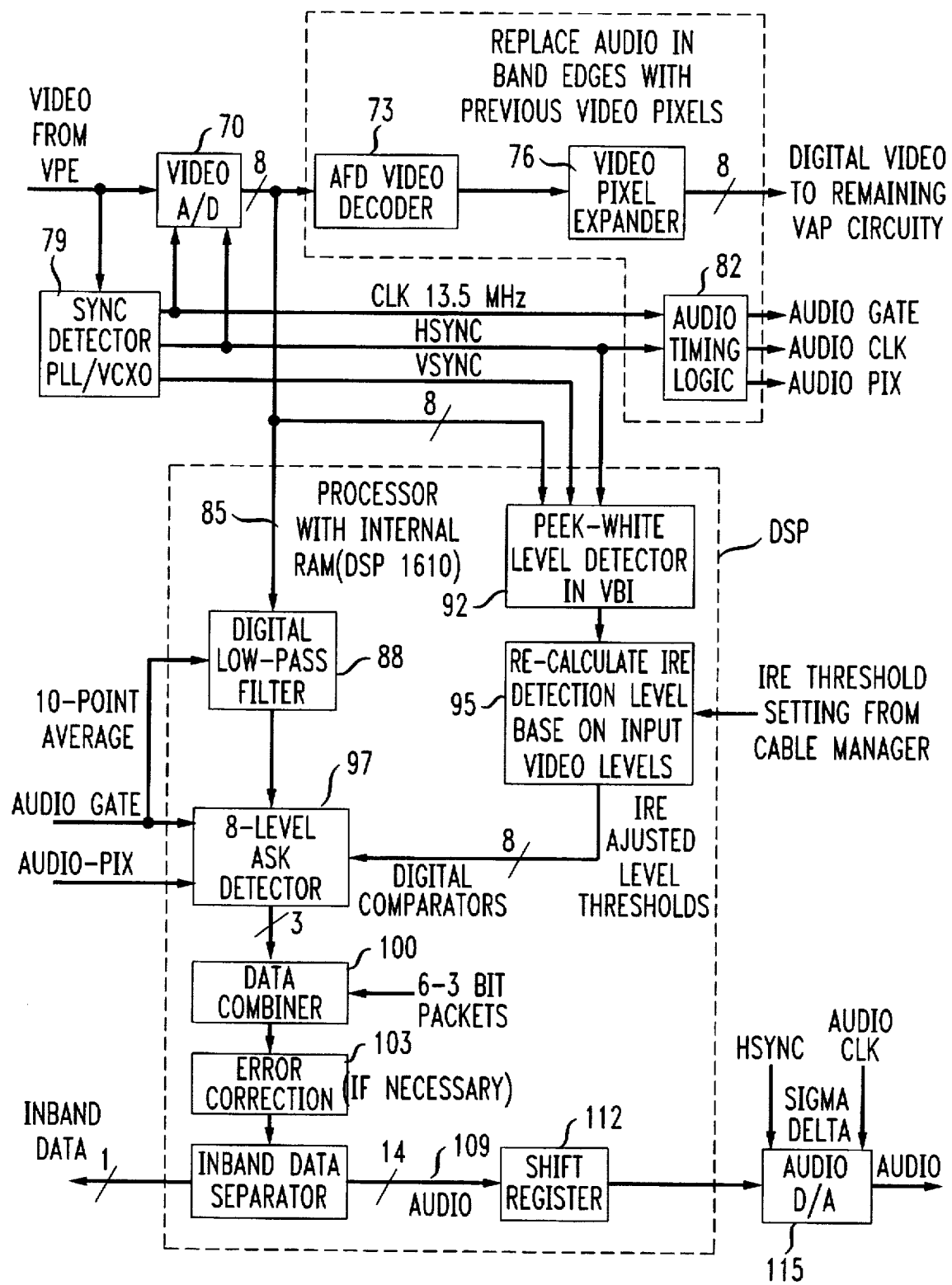
FIG. 9 illustrates a block diagram of a decoder used to extract audio information from the video signal.

FIG. 9 illustrates a decoder. The overall function is to (1) extract the video information, (2) eliminate the vertical noise stripes, by stretching the video image by 12.6 percent, and (3) recover the audio information.

Block 70 digitizes the incoming analog video signal. The digitized signal is delivered to a video decoder 73, which extracts the video information, and passes it to an expander 76, which stretches the video image by 12.6 percent, to cover the vertical stripes, which were created by overwriting the video data with audio samples, as shown in FIG. 3. Components 73 and 76, by themselves, are known in the art.

Block 79 detects the horizontal synch pulses, and, using a phase-locked loop (PLL), generates a clock signal running at 13.5 MHz, for use by procesing curcuitry indicated by block 82.

A Digital Signal Processor (DSP) extracts the audio information from the video signal on bus 85, in block 88. Meanwhile, block 92 calculates the peak level of the video luminance signal, and block 95 computes the nine levels (shown in FIG. 5), based on the peak video level, and on the training levels received (shown in FIG. 6).

Block 97 derives the 3-bit symbols from the audio information, and block 100 combines these into groups of six symbols. These groups correspond to the 18-bit packets discussed above.

Error correction (which can be optional) is performed by block 103. The 14 bits of audio information (corresponding to the data on bus 37 in FIG. 8) are produced on bus 109 in FIG. 9. The parallel 14-bit groups are converted to a serial bit stream by a shift register 112, and delivered to a digital-to-analog (D/A) converter 115, which produces AUDIO, as indicated. The AUDIO is synchronized with the video (not indicated) by the clock inputs to the D/A.

Important Considerations

1. Ordinary "video signals" actually contain two separate signals, carried by separate carriers. For example, channel 5 includes a video carrier at 77.25 MHz and an audio carrier at 81.75 MHz. (See *Reference Data for Engineers, Radio, Electronics, Computer, and Communications*, E. C. Jordan, Ed., Howard K. Sams & Co., Indianapolis, Ind., 7th edition, 1985, section 35.)

Either carrier, by itself, can deliver its respective information, without the other. That is, if the audio carrier is blocked, nevertheless, a television receiver will still display the video image. Conversely, if the video signal is blocked, the receiver will still produce the audio sound.

In contrast, under the invention, a single carrier contains both the audio and the video.

2. The signal shown in FIG. 5 contains several types of information. One type is video information, which is contained in the VIDEO LINE. Another type is audio information, contained in BANDS 1 and 2. A third type can be termed "control signals," such as the color burst and the horizontal synch pulses.

One major difference between the information- and control signals is that the information signals (ie, video and audio information) contain information which can be decoded to produce imagery, or sound. The control signals contain no such information, but act primarily to "format" the information signals into a form understandable to a human observer.

3. Reduction of the number of video frames was discussed. Reduction is not strictly necessary, in order to implement the invention. The reduction reduces the bandwidth required by the video signal. In some cases, reduction may not be necessary.

4. The invention is particularly useful in video conferencing. AFD compression is suitable for use in video conferencing.

5. The duration of the training signals shown in FIG. 6 is 24.44 micro-seconds. This duration provides ample time for the receiver to obtain a meaningful average of each training signal. (In practice, the training signals do not take the form of the perfect square waves shown. Instead, they will contain noise.)

6. As a security measure, the audio can be scrambled. One simple scrambling procedure is to re-arrange the order of the six 3-bit words in each group, associated with multiplexer 51 in FIG. 78. For example, in each group of six, the initial order would be 1, 2, 3, 4, 5, 6. This order can be re-arranged to 3, 2, 1, 6, 5, 4. The decoder, shown in FIG. 9, knows the order of scrambling, and de-scrambles accordingly.

The order can be changed dynamically. For example, there are six-factorial, or 720, possible sequences in which the six lines can be arranged. At predetermined times, the encoder can select a new sequence. The decoder either follows, or is informed as to the new sequence.

The audio can also be encrypted. The encoder can, for example, EX-OR each 3-bit word with a reference word, or key, to produce an encrypted 3-bit word. The decoder EX-ORs the encrypted 3-bit word with the same key, to obtain the original 3-bit word.

7. The invention includes a signal which contains, in addition to other information, the repeated sequence of . . . audio information . . . video information . . . audio information . . . BAND 1 in FIG. 5 illustrates audio information, the VIDEO LINE illustrates video information, and BAND 2 illustrates audio information.

We claim:

1. A method of transmitting a video signal which initially runs at a frame rate, with accompanying audio, comprising the following steps:

a) dropping video frames, to reduce bandwidth required by the video signal;
   b) sampling the audio;
   c) encoding audio samples using ASK;
   d) inserting audio samples into space made available by the reduction in bandwidth.

2. Method according to claim 1, and further comprising the step of:

e) transmitting a sequence of reference levels, which define ranges used in ASK decoding.

3. In the transmission of a video image, a method of generating a video carrier;

imposing a video signal on the video carrier with each periodic interval of the video signal allocated to video signals defining a line;

the improvement comprising the steps of:
   a) transmitting training signals to a receiver;
   b) receiving information from the receiver which indicates size of signals received;
   c) deriving thresholds for ASK encoding, based, in part on the information received; and
   d) transmitting the thresholds to the receiver.

4. In the transmission of a video image, the method comprising the steps of generating a video carrier;

imposing a video signal on the video carrier with each periodic interval of the video signal allocated to video signals defining a line;

transmitting an associated audio signal;

the improvement comprising the steps of:
   a) transmitting signals to a receiver, which define thresholds for ASK data; and
   b) transmitting ASK data to the receiver.

5. Improvement according to claim 4, in which the audio samples create regions of noise when the video signal is rendered visible.

* * * * *